(12) United States Patent
Doorbar

(10) Patent No.: US 8,647,453 B2
(45) Date of Patent: Feb. 11, 2014

(54) METHOD OF MANUFACTURING A FIBRE REINFORCED METAL MATRIX COMPOSITE ARTICLE

(75) Inventor: Philip J Doorbar, Derby (GB)

(73) Assignee: Rolls-Royce PLC, London (GB)

( * ) Notice: Subject to any disclaimer, the term of this patent is extended or adjusted under 35 U.S.C. 154(b) by 392 days.

(21) Appl. No.: 13/196,397

(22) Filed: Aug. 2, 2011

(65) Prior Publication Data

US 2012/0037602 A1 Feb. 16, 2012

(30) Foreign Application Priority Data

Aug. 11, 2010 (GB) .................................. 1013440.1

(51) Int. Cl.
*B23K 20/00* (2006.01)
*B23K 20/10* (2006.01)
*B23K 20/24* (2006.01)
*B23K 15/00* (2006.01)

(52) U.S. Cl.
USPC ....... 156/73.1; 29/899.71; 264/442; 228/193; 228/110.1; 228/176; 219/121.14

(58) Field of Classification Search
USPC ................ 29/889.2, 889.7, 889.71; 156/73.1; 228/110.1, 111, 175, 176, 193, 903; 219/121.12, 121.13, 121.14, 121.63, 219/121.64; 264/442
See application file for complete search history.

(56) References Cited

U.S. PATENT DOCUMENTS

| | | | |
|---|---|---|---|
| 5,869,814 A * | 2/1999 | Scoles ............................ | 219/633 |
| 5,946,801 A * | 9/1999 | Twigg et al. ................ | 29/889.71 |
| 7,624,906 B2 * | 12/2009 | Yan et al. .................... | 228/111.5 |
| 7,781,698 B2 * | 8/2010 | Franchet et al. ......... | 219/121.64 |
| 2006/0269746 A1 | 11/2006 | Franchet et al. | |

FOREIGN PATENT DOCUMENTS

| | | |
|---|---|---|
| EP | 0 831 154 A1 | 3/1998 |
| EP | 1 527 842 A1 | 5/2005 |
| EP | 1 533 066 A1 | 5/2005 |
| EP | 1 533 067 A1 | 5/2005 |
| EP | 1 533 393 A2 | 5/2005 |
| JP | A-2000-054091 | 2/2000 |

OTHER PUBLICATIONS

British Search Report issued in Application No. GB1013440.1 dated Nov. 12, 2010.

* cited by examiner

*Primary Examiner* — Samuel M Heinrich
(74) *Attorney, Agent, or Firm* — Oliff PLC

(57) ABSTRACT

A method of manufacturing a fiber reinforced metal matrix composite article, the method comprises forming a first metal component, forming a second metal component and forming at least one fiber preform comprising at least one metal coated fiber. The metal at least one first portion of the at least one metal coated fiber of the at least one fiber preform is bonded to the metal at least one second portion of the at least one metal coated fiber of the at least one fiber preform to hold the at least one fiber in position. The at least one fiber preform is placed between the first metal component and the second metal component. The second metal component is sealed to the first metal component, and heat and pressure is applied such as to consolidate the at least one fiber preform and to diffusion bond the metal on the fiber of the at least one fiber preform, the first metal component and the second metal component to form a unitary composite article. The bonding comprises ultrasonic welding.

25 Claims, 6 Drawing Sheets

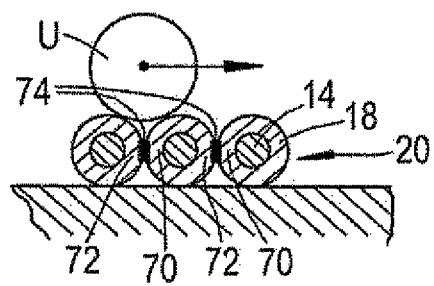
Fig.13
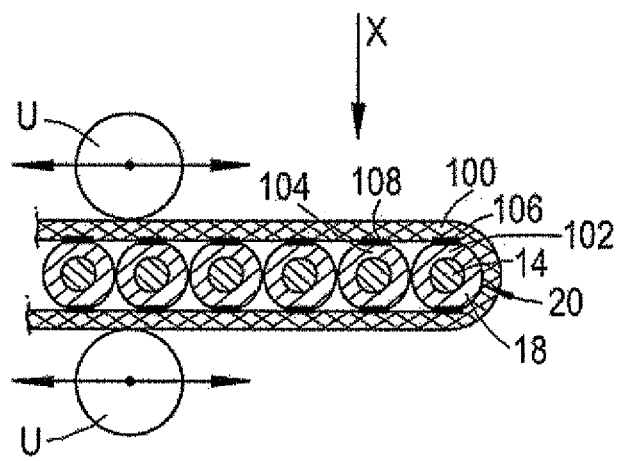
Fig.14
Fig.15
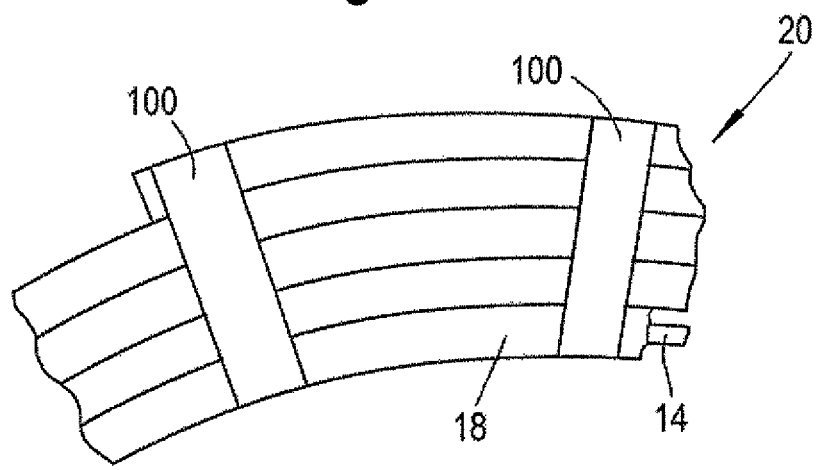

METHOD OF MANUFACTURING A FIBRE REINFORCED METAL MATRIX COMPOSITE ARTICLE

The present invention relates to a method of manufacturing a fibre reinforced metal matrix composite article and in particular to a method of manufacturing a fibre reinforced metal matrix composite rotor, or disc, particularly for a gas turbine engine.

It is known from EP0831154A1, EP1527842A1, EP1533066A1, EP1533067A1 and EP1533393A2 to manufacture fibre reinforced metal matrix composite articles, e.g. rotors. These documents disclose that the metal matrix composite article is manufactured by forming a first metal workpiece, forming a second metal workpiece and forming metal coated fibres. An annular groove is formed in the first metal workpiece and the metal coated fibres are placed in the groove in the first metal workpiece. An annular projection is formed on the second metal workpiece and the projection of the second metal workpiece is inserted into the groove in the first metal workpiece. The second metal workpiece is sealed to the first metal workpiece and the space between the first and second metal workpieces is evacuated. Then the first and second metal workpieces are diffusion bonded together and the metal on the metal coated fibres is bonded together and to the first and second metal workpieces to form a unitary composite article.

In addition each metal coated fibre is wound into an annular fibre preform and each annular fibre preform is held in place using an adhesive. The adhesive is removed by heating during the evacuation of the space between the first and second metal workpieces.

A problem with this method is that there is a possibility that some of the adhesive may be left as a residue on the metal coated fibres and the residue may adversely affect the subsequent diffusion bonding and consolidating step. Another problem is that once the adhesive has been removed from the annular fibre preforms there is a possibility that one or more of the metal coated fibres may move prior to the subsequent diffusion bonding and consolidation and thereby reduce the quality of the metal matrix composite article produced.

Accordingly the present invention seeks to provide a novel method of manufacturing a fibre reinforced metal matrix composite article which reduces, preferably overcomes, the above mentioned problem.

Accordingly the present invention provides a method of manufacturing a fibre reinforced metal matrix composite article, the method comprising the steps of:
(a) forming a first metal component,
(b) forming a second metal component,
(c) forming at least one fibre preform, the at least one fibre preform comprising at least one metal coated fibre,
(d) bonding the metal at least one first portion of the at least one metal coated fibre of the at least one fibre preform to the metal at least one second portion of the at least metal coated fibre of the at least one fibre preform to hold the at least one fibre in position, wherein the bonding comprises ultrasonic welding,
(e) placing the at least one fibre preform between the first metal component and the second metal component,
(f) sealing the second metal component to the first metal component, and
(g) applying heat and pressure such as to consolidate the at least one fibre preform and to diffusion bond the metal on the fibre of the at least one fibre preform, the first metal component and the second metal component to form a unitary composite article.

Step (d) may comprise bonding the metal at a plurality of first portions of the at least one metal coated fibre of the at least one fibre preform to the metal at a plurality of second portions of the at least metal coated fibre of the at least one fibre preform to hold the at least one fibre in position Step (d) may comprise local ultrasonic welding to directly weld the metal at the first position to the metal at the second position. Step (d) may be a line of spot welds.

Alternatively step (d) may comprise providing a metal member and bonding the metal at least one first portion of the at least one metal coated fibre of the at least one fibre preform to the metal member and bonding the metal at least one second portion of the at least one metal coated fibre of the at least one fibre preform to the metal member to the hold the at least one fibre in position.

The metal member may be a metal wire or a metal foil.

The method may comprise wrapping the metal member around the at least one metal coated fibre.

Alternatively step (d) may comprise ultrasonic welding the metal of the at least one metal coated fibre of the least one fibre preform to the metal coated fibre of the at least one fibre preform in a line weld.

Step (c) may comprise winding the at least one metal coated fibre in a spiral. Step (c) may comprise winding the at least one metal coated fibre such that the metal on adjacent turns of the metal coated fibre abut each other. Step (c) may comprise winding the at least one metal coated fibre such that there is a space between the metal on adjacent turns of the metal coated fibre. Step (c) may comprise winding at least one metal wire with the at least one metal coated fibre in a spiral.

Step (c) may comprise arranging a plurality of metal coated fibres in a plane with the metal coated fibres extending in a single direction. Step (c) may comprise arranging the plurality of metal coated fibres such that the metal on adjacent metal coated fibres abuts each other. Step (c) may comprise arranging the plurality of metal coated fibres such that there is a space between the metal on adjacent metal coated fibres. Step (c) may comprise arranging a plurality of metal wires with the plurality of metal coated fibres such there is a metal wire between adjacent metal coated ceramic fibres.

Step (d) may comprise bonding the metal at least one first portion of a first metal coated fibre of the at least one fibre preform to the metal at least one second portion of a second metal coated fibre of the at least one fibre preform to hold the at least one fibre in position.

Step (d) may comprise bonding the metal of each metal coated fibre of the at least one fibre preform to the metal of each adjacent metal coated fibre of the at least one fibre preform at least one position to hold the at least one fibre in position.

Step (d) may comprise bonding the metal of each metal coated fibre of the at least one fibre preform to the metal of each adjacent metal coated fibre of the at least one fibre preform at a plurality of positions to hold the at least one fibre in position.

The at least one fibre may comprise a silicon carbide fibre, a silicon nitride fibre, a boron fibre, a carbon fibre, a tungsten fibre or an alumina fibre.

The at least one metal coated fibre may comprise a titanium coated fibre, a titanium alloy coated fibre or a titanium aluminide coated fibre.

The first metal component may comprise titanium, titanium alloy or titanium aluminide.

Step (a) may comprise forming a groove in the first metal component, step (e) comprises placing the at least one fibre preform in the groove of the first metal component and placing the second metal component in the groove of the metal component.

Step (b) may comprise forming a projection on the second metal component and step (e) comprises placing the projection of the second metal component in the groove of the first metal component.

Step (a) may comprise forming a circumferentially and axially extending groove in an end face of the first metal member, step (b) comprises forming a circumferentially and axially extending projection on an end face of the second metal component, step (c) comprises winding at least one metal coated fibre on a former to form the fibre preform, step (e) comprises placing the fibre preform in the circumferentially extending groove of the first metal component and placing the second metal component in the groove of the first metal component.

The fibre reinforced metal matrix composite article may comprise a rotor, a shaft or a stator. The fibre reinforced metal matrix composite article may comprise integral rotor blades. The fibre reinforced metal matrix composite article may comprise a gas turbine engine rotor, shaft or stator. The fibre reinforced metal matrix composite article may comprise an electrical machine rotor, shaft or stator.

The present invention will be more fully described by way of example with reference to the accompanying drawings in which:

FIG. 13 is a cross-sectional view through a portion of a fibre preform showing a seventh method of bonding the fibre preform together.

FIG. 14 is a cross-sectional view through a portion of a fibre preform showing an eighth method of bonding the fibre preform together.

FIG. 15 is a plan view of a portion of a fibre preform showing the eighth method of bonding the fibre preform together.

Figure 1:
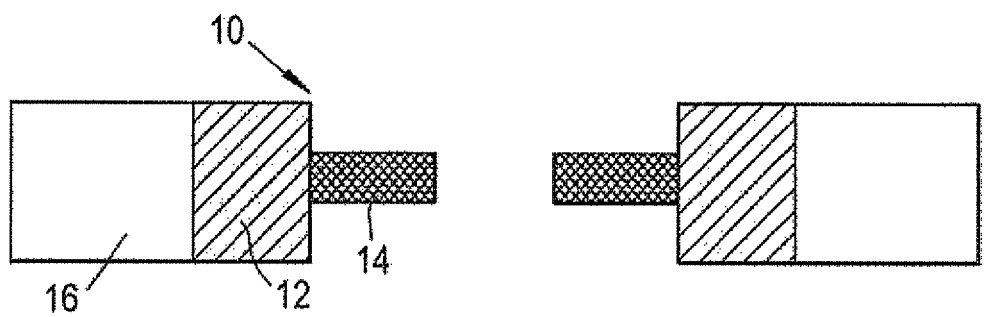
FIG. 1 is a longitudinal, axial, cross-sectional view through a bladed compressor rotor made according to a method of the present invention.

A finished ceramic fibre reinforced metal rotor 10 with integral rotor blades is shown in FIG. 1. The rotor 10 comprises a metal ring 12, which includes a ring of circumferentially extending reinforcing ceramic fibres 14, which are embedded in the metal ring 12. A plurality of solid metal rotor blades 16 are circumferentially spaced on the periphery of the metal ring 12 and the rotor blades 16 extend radially outwardly from and are integral with the metal ring 12.

Figure 2:
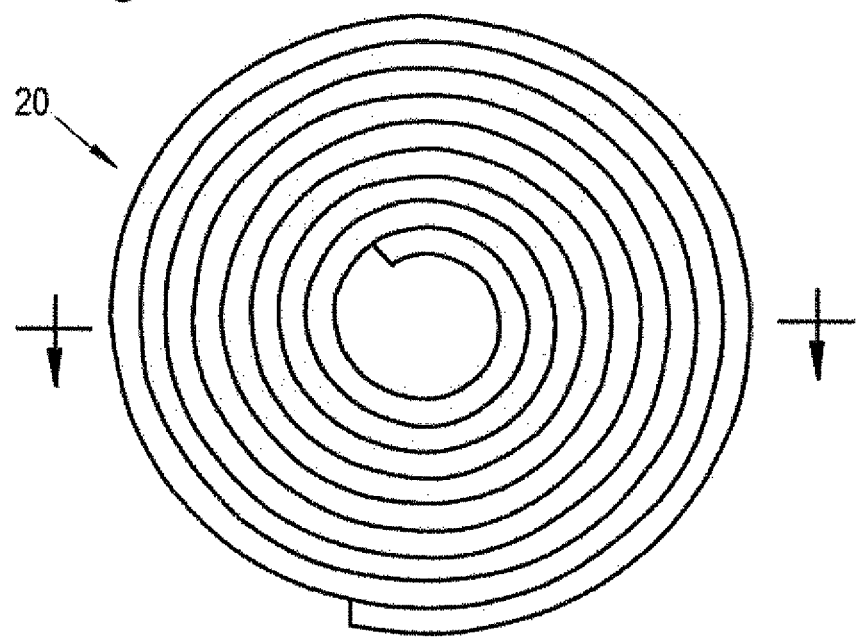
FIG. 2 is a plan view of a fibre preform used in the method of the present invention.
Figure 3:
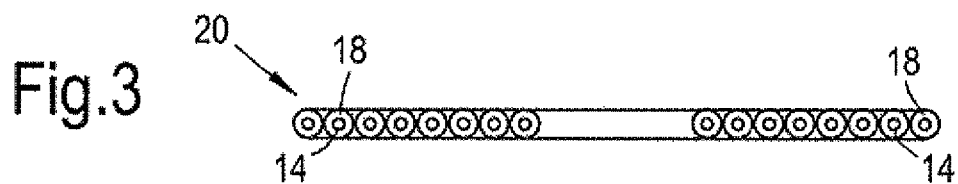
FIG. 3 is a cross-sectional view through the fibre preform shown in FIG. 2.

A ceramic fibre reinforced metal rotor 10 is manufactured using a plurality of metal-coated ceramic fibres. Each ceramic fibre 14 is coated with metal matrix 18 by any suitable method, for example physical vapour deposition, sputtering, molten metal deposition, adhesively bonding metal powder, wrapping metal wires etc. Each metal coated 18 ceramic fibre 14 is wound around a mandrel to form an annular, or disc shaped, fibre preform 20 as shown in FIGS. 2 and 3. Each annular, or disc shaped, fibre preform 20 thus comprises a single metal coated ceramic fibre 14 arranged in a spiral with adjacent turns of the spiral abutting each other. Alternatively, each annular, or disc shaped, fibre preform comprises a single metal coated ceramic fibre 14 and a single metal wire which are wound together around a mandrel such that the turns of the single metal coated fibre are positioned between the turns of the metal wire.

Figure 4:
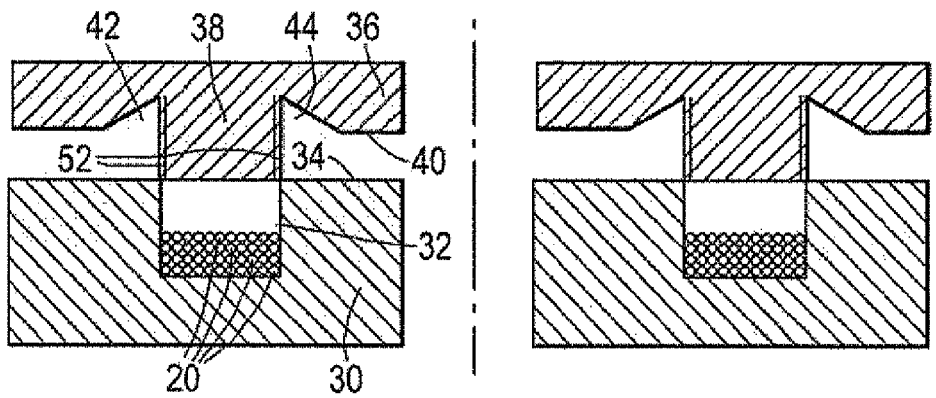
FIG. 4 is a longitudinal, axial, cross-sectional view through an assembly of fibre preforms positioned between first and second metal rings.

A first metal ring, or metal disc, 30 is formed and an annular axially extending groove 32 is machined in one radially extending and axially facing face 34 of the first metal ring 30, as shown in FIG. 4. The annular groove 32 has straight parallel sides, which form a rectangular cross-section. A second metal ring, or metal disc, 36 is formed and an annular axially extending projection 38 is machined from the second metal ring, or metal disc, 36 such that it extends from one radially extending and axially facing face 40 of the second metal ring, or metal disc, 36. The second metal ring, or metal disc, 36 is also machined to form two annular grooves 42 and 44 in the face 40 of the second metal ring, or metal disc, 36. The annular grooves 42 and 44 are arranged radially on opposite sides of the annular projection 38 and the annular grooves 42 and 44 are tapered radially from the face 40 to the base of the annular projection 38. The radially inner and outer dimensions, diameters, of the annular projection 38 are substantially the same as the radially inner and outer dimensions of the annular groove 32.

One or more of the annular fibre preforms 20 are positioned coaxially in the annular groove 32 in the face 34 of the first metal ring 30. The radially inner and outer dimensions, diameters, of the annular fibre preforms 20 are substantially the same as the radially inner and outer dimensions, diameters, of the annular groove 32 to allow the annular fibre preforms 20 to be loaded into the annular groove 32 while substantially filling the annular groove 32. A sufficient number of annular fibre preforms 20 are stacked in the annular groove 32 to partially fill the annular groove 32 to a predetermined level, as shown in FIG. 4.

The second metal ring 36 is then arranged such that the face 40 confronts the face 34 of the first metal ring 30 and the axes of the first and second metal rings 30 and 36 are aligned such that the annular projection 38 on the second metal ring 36 aligns with the annular groove 32 in the first metal ring 30. The second metal ring 36 is then pushed towards the first metal ring 30 such that the annular projection 38 enters the annular groove 32.

Figure 5:
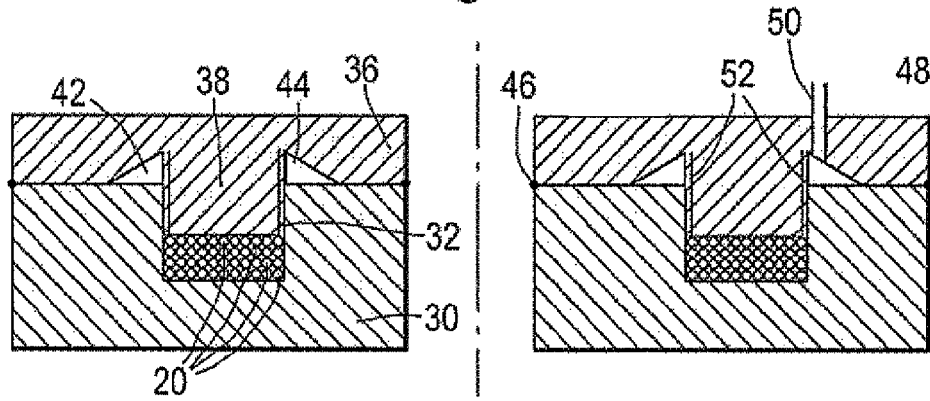
FIG. 5 is a longitudinal, axial, cross-sectional view through an assembly of fibre preforms positioned between first and second metal rings after welding together.

The radially inner and outer peripheries of the face 34 of the first metal ring 30 are sealed to the radially inner and outer peripheries of the face 40 of the second metal ring 36 to form a sealed assembly. The sealing is preferably by TIG welding, electron beam welding, laser welding or other suitable welding processes to form an inner annular weld seal 46 and an outer annular weld seal 48 as shown in FIG. 5.

The sealed assembly is evacuated using a vacuum pump and pipe 50 connected to the grooves, or chambers, 42 and 44. The sealed assembly is then heated and pressure is applied to the sealed assembly to produce axial consolidation of the annular fibre preforms 20 and diffusion bonding of the first metal ring 30 to the second metal ring 36 and diffusion bonding of the metal on the metal coated 18 ceramic fibres 14 to the metal on other metal coated 18 ceramic fibres 14, to the first metal ring 30 and to the second metal ring 36. During the application of heat and pressure the pressure acts equally from all directions on the sealed assembly, and this causes the annular projection 38 to move axially into the annular groove 32 to consolidate the annular fibre preforms 20.

Figure 6:
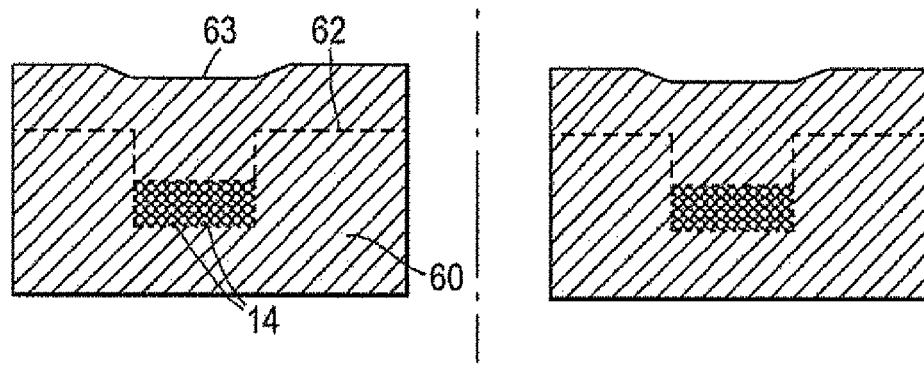
FIG. 6 is a longitudinal, axial, cross-sectional view through an assembly of fibre preforms positioned between first and second metal rings after consolidation and bonding to form a unitary composite article.

The resulting consolidated and diffusion bonded ceramic fibres reinforced component is shown in FIG. 6 which shows the ceramic fibres 14 and the diffusion bond region 62. Additionally the provision of the annular grooves, or chambers, 42 and 44 allows the annular projection 38 to move during the consolidation process and in so doing this results in the formation of a recess 63 in the surface of what was the second metal ring 36. The recess 63 indicates that successful consolidation has occurred.

After consolidation and diffusion bonding the article is machined to remove at least a portion of what was originally the first metal ring, at least a portion of the second metal ring and at least a portion of the diffusion bonded region. In this example the majority of the second metal ring and the majority of the diffusion bonded region is removed. If the article is near net shape, the amount of machining only a little of the second metal ring and the majority of the diffusion bonded region is removed. Thus the fibre reinforced area is retained in its intended shape with straight, flat, sides and thus the machining is in planes to produce flat, planar, surfaces on the article to provide a uniform distance between the surfaces and the fibre reinforced areas.

The article may then be machined for example by electrochemical machining or milling to form the integral compressor blades, as shown in FIG. 1, or the article may be machined to form one or more slots to receive the roots of the compressor blades.

Alternatively, the compressor blades may be friction welded, laser welded or electron beam welded onto the article.

The present invention provides a novel method of producing the annular fibre preforms, which does not use a glue to hold each of the annular fibre preforms in position and does not require subsequent removal of the glue from the annular fibre preforms.

The present invention produces each annular fibre preform initially in the same manner by winding the metal coated ceramic fibre around a mandrel or former. Then the metal at least one first portion of the metal coated ceramic fibre of each annular fibre preform is bonded to the metal at least one second portion of the metal coated ceramic fibre of the annular fibre preform to hold the metal coated ceramic fibre in position within the annular fibre preform. In particular the metal at a plurality of first portions of the metal coated ceramic fibre of each annular fibre preform is bonded to the metal at a plurality of second portions of the metal coated ceramic fibre of the annular fibre preform to hold the metal coated ceramic fibre in position. The bonding comprises ultrasonic welding. It is important that the bonding is local such that the metal on the metal coated ceramic fibre is bonded together but there is no local damage to the ceramic fibre.

The bonding of the metal may comprise local ultrasonic welding to directly weld the metal at the first position to the metal at the second position.

The use of ultrasonic welding may be particularly advantageous as heat is added during the bonding process by vibrating the metal at the first portion against the metal at the second portion. This may lead to a cooler welding process and a corresponding smaller weld zone and localised to the surface of the metal coating on the ceramic fibre. This is advantageous as the weld zone may be prone to brittleness; therefore, it follows that there is less likelihood of damage to the metal coated ceramic fibre, which is beneficial to forming a useful preform.

Alternatively the bonding of the metal may comprise providing a metal member and bonding the metal at least one first portion of the metal coated ceramic fibre of the annular fibre preform to the metal member and bonding the metal member to the at least one second portion of the metal coated ceramic fibre of the annular fibre preform to hold the metal coated ceramic fibre in position. The metal member may be a metal wire or a metal foil. The method may comprise wrapping the metal member around the metal coated ceramic fibre.

Alternatively the metal of the metal coated ceramic fibre of the annular fibre preform is ultrasonically welded to the metal coated ceramic fibre of the annular fibre preform in a line weld. The line weld may extend a relatively short distance or may extend a relatively short distance longitudinally along the metal coated ceramic fibre.

Figure 7:
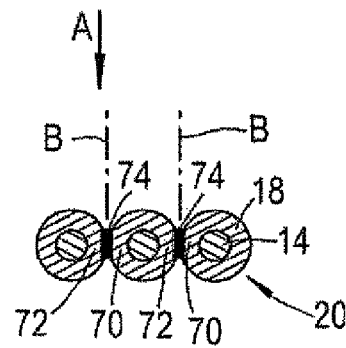
FIG. 7 is a cross-sectional view through a portion of a fibre preform showing a first method of bonding the fibre preform together.
Figure 7A:
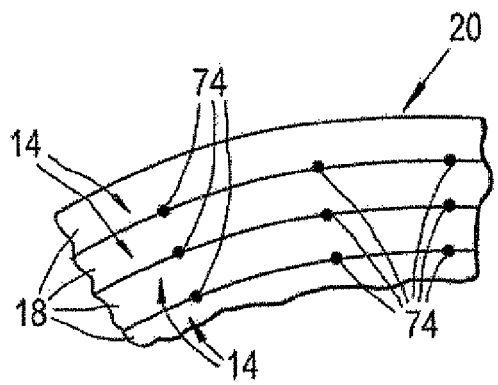
FIG. 7A is a view in the direction of arrow A in FIG. 7.
Figure 7B:
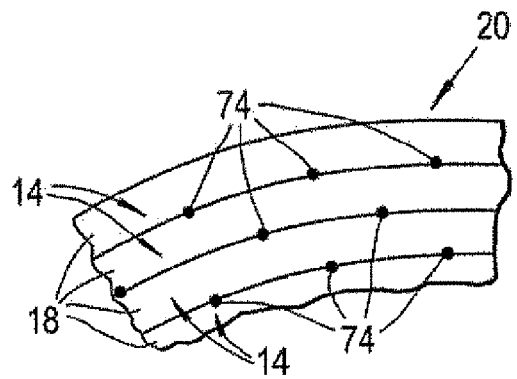
FIG. 7B is an alternative view in the direction of arrow A in FIG. 7.

A first method of bonding the metal 18 of the metal coated 18 ceramic fibre 14 is shown in FIG. 7. In this method the metal coated 18 ceramic fibre 14 is wound such that the metal 18 on adjacent turns of the metal coated 18 ceramic fibre 14 abut each other. This method comprises directing a beam B of radiation locally onto the annular fibre preform 20 to form a weld, or a fusion, 74 between the metal 18 of the metal coated 18 ceramic fibre 14 at a first position 70 to the metal 18 of the metal coated 18 ceramic fibre 14 at a second position 72. The beam B may be a laser beam or an electron beam. Furthermore, the beam B of radiation is directed locally onto the annular fibre preform 20 to form a plurality of welds 74 between the metal of the metal coated 18 ceramic fibre 14 at a plurality of first positions 70 to the metal 18 of the metal coated 18 ceramic fibre 14 at a plurality of second positions 72. As shown in FIG. 7A the welds 74 are arranged along a radius of the annular fibre preform 20 and a plurality of welds 74 may be arranged along each of one or more radii of the annular fibre preform 20. Alternatively, as shown in FIG. 7B a plurality of welds 74 may simply be arranged longitudinally spaced along the spirally wound metal coated 18 ceramic fibre 14 between the metal 18 on adjacent turns of the metal coated 18 ceramic fibre 14.

Figure 8:
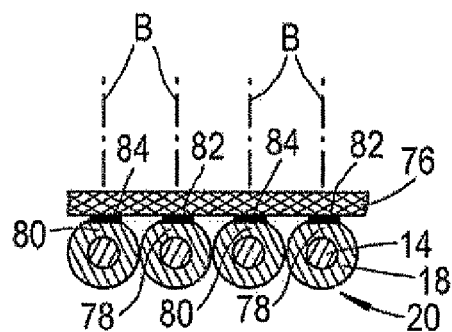
FIG. 8 is a cross-sectional view through a portion of a fibre preform showing a second method of bonding the fibre preform together.

A second method of bonding the metal of the metal coated 18 ceramic fibre 14 is shown in FIG. 8. In this method the metal coated 18 ceramic fibre 14 is wound such that the metal 18 on adjacent turns of the metal coated 18 ceramic fibre 14 abut each other. This method comprises providing a metal foil 76 adjacent to and abutting the annular fibre preform 20 and directing a beam B of radiation locally onto the metal foil 76 and the annular fibre preform 20 to form a weld, or a fusion, 82 between the metal 18 of the metal coated 18 ceramic fibre 14 at a first position 78 to the metal foil 76 and to form a weld, or fusion, 84 between the metal 18 of the metal coated 18 ceramic fibre 14 at a second position 80 to the metal foil 76. Thus, the welds 82 and 84 bond the metal 18 of the metal coated 18 ceramic fibre 14 at the first position 78 to the metal 18 of the metal coated 18 ceramic fibre 14 at the second position 80. The beam B may be a laser beam or an electron beam. Furthermore, the beam B of radiation is directed locally onto the annular fibre preform 20 and metal foil 76 to form a plurality of welds 82 and 84 between the metal of the metal coated 18 ceramic fibre 14 at a plurality of first positions 78 to the metal 18 of the metal coated 18 ceramic fibre 14 at a plurality of second positions 80. As shown in FIG. 8 the welds 82 and 84 are arranged along a radius of the annular fibre preform 20 and metal foil 76 and a plurality of welds 82 and 84 may be arranged along each of one or more radii of the annular fibre preform 20 and metal foil 76. Alternatively, a plurality of welds 82 and 84 may simply be arranged longitudinally spaced along the spirally wound metal coated 18 ceramic fibre 14 between the metal 18 of the metal coated 18 ceramic fibre 14 and the metal foil 76.

Figure 9:
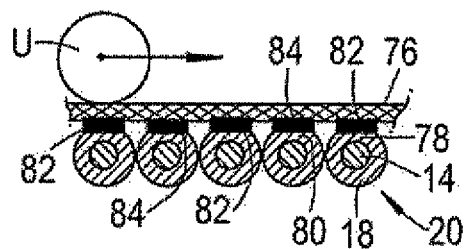
FIG. 9 is a cross-sectional view through a portion of a fibre preform showing a third method of bonding the fibre preform together.

A third method of bonding the metal of the metal coated 18 ceramic fibre 14 is shown in FIG. 9. In this method the metal coated 18 ceramic fibre 14 is wound such that the metal 18 on adjacent turns of the metal coated 18 ceramic fibre 14 abut each other. This method is similar to that shown in FIG. 8, and this method comprises providing a metal foil 76 adjacent to and abutting the annular fibre preform 20, but instead of using a beam B of radiation an ultrasonic welder U is used to locally form a weld, or a fusion, 82 between the metal 18 of the metal coated 18 ceramic fibre 14 at a first position 78 to the metal foil 76 and to form a weld, or fusion, 84 between the metal 18 of the metal coated 18 ceramic fibre 14 at a second position 80 to the metal foil 76. Thus, the welds 82 and 84 bond the metal 18 of the metal coated 18 ceramic fibre 14 at the first position 78 to the metal 18 of the metal coated 18 ceramic fibre 14 at the second position 80. The ultrasonic welder U locally welds the annular fibre preform 20 and metal foil 76 to form a plurality of welds 82 and 84 between the metal of the metal coated 18 ceramic fibre 14 at a plurality of first positions 78 to the metal 18 of the metal coated 18 ceramic fibre 14 at a plurality of second positions 80. As shown in FIG. 9 the welds 82 and 84 are arranged along a radius of the annular fibre preform 20 and metal foil 76 and a plurality of welds 82 and 84 may be arranged along each of one or more radii of the annular fibre preform 20 and metal foil 76. Alternatively, a plurality of welds 82 and 84 may simply be arranged longitudinally spaced along the spirally wound metal coated 18 ceramic fibre 14 between the metal 18 of the metal coated 18 ceramic fibre 14 and the metal foil 76. The ultrasonic welder U produces vibration and rubbing between adjacent turns of the metal coated 18 ceramic fibre 14 to cause the metal 18 to be locally welded together.

There may be some manufacturing flexibility in using the metal foil 76 and the metal coated 18 ceramic fibre 14 in combination. By varying the thickness of the metal 18 and the thickness of the metal foil 76 it is possible to control the ratio of metal to ceramic fibre 14 in the region of the consolidated annular preforms 20, e.g., the volume fraction of the ceramic fibre 14. For instance, the metal coating 18 on the ceramic fibre 14 may be increased in thickness and the metal foil 76 reduced in thickness. Alternatively, the metal foil 76 may be increased in thickness and the metal coating 18 reduced in thickness as far as practicable. A thinner metal coating 18 on the ceramic fibre 14 may allow the coating process to be completed in a shorter period giving a corresponding manufacturing efficiency.

Figure 10:
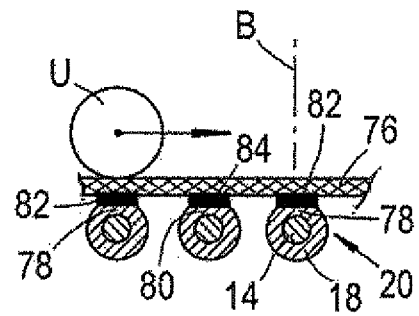
FIG. 10 is a cross-sectional view through a portion of a fibre preform showing a fourth method of bonding the fibre preform together.

A fourth method of bonding the metal of the metal coated 18 ceramic fibre 14 is shown in FIG. 10. This method is similar to that shown in FIGS. 8 and 9 and uses an ultrasonic welder U to form welds between the metallic foil 76 and the metal 18 on the metal coated 18 ceramic fibre 14 of the annular fibre preform 20. This method differs in that the metal coated 18 ceramic fibre 14 is wound such that there is a space between the metal 18 on adjacent turns of the metal coated 18 ceramic fibre 14, this provides flexibility and allows bending of the annular fibre preform 20. Again the welds 82 and 84 may be arranged along a radius of the annular fibre preform 20 or longitudinally along the metal coated 18 ceramic fibre 14. The space between the metal of the metal 18 coated ceramic fibres 14 is adjustable to vary the amount of bending of the annular fibre preform 20.

Figure 11:
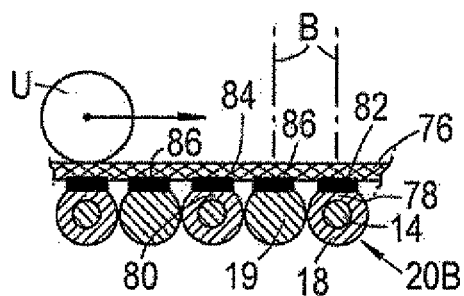
FIG. 11 is a cross-sectional view through a portion of a fibre preform showing a fifth method of bonding the fibre preform together.

A fifth method of bonding the metal of the metal coated 18 ceramic fibre 14 is shown in FIG. 11. This method is similar to that shown in FIG. 10 and uses an ultrasonic welder U to form welds between the metallic foil 76 and the metal 18 on the metal coated 18 ceramic fibre 14 of the annular fibre preform 20B. In this method the metal coated 18 ceramic fibre 14 is also wound such that there is a space between the metal 18 on adjacent turns of the metal coated 18 ceramic fibre 14. In addition the metal coated 18 ceramic fibre 14 is wound together with a metal wire 19 such that the metal wire 19 is positioned in the space between the adjacent turns of the metal coated 18 ceramic fibre 14 to form the annular fibre preform 20B. The metal wire 19 has approximately the same diameter as the diameter of the metal coated 18 ceramic fibre 14 or the metal wire 19 has a different diameter, smaller or larger, to the metal coated 18 ceramic fibre 14 in order to control the ultimate volume fraction of the ceramic fibres in the fibre reinforced metal matrix composite article. In this method there are also local welds 86 between the metal foil 76 and the metal wire 19. Again the welds 82, 86 and 84 may be arranged along a radius of the annular fibre preform 20 or longitudinally along the metal coated 18 ceramic fibre 14 and metal wire 19.

Figure 12:
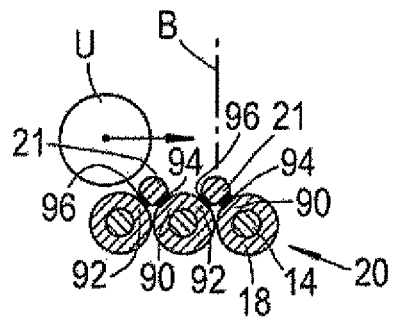
FIG. 12 is a cross-sectional view through a portion of a fibre preform showing a sixth method of bonding the fibre preform together.

A sixth method of bonding the metal of the metal coated 18 ceramic fibre 14 is shown in FIG. 12. This method is similar to that shown in FIGS. 8 and 9 and in this method the metal coated 18 ceramic fibre 14 is wound such that the metal 18 on adjacent turns of the metal coated 18 ceramic fibre 14 abut each other. In addition a metal wire 21, with a diameter smaller than the diameter of the metal coated 18 ceramic fibre 14, is wound such that the metal wire 19 abuts the adjacent turns of the metal coated 18 ceramic fibre 14. An ultrasonic welder U is used to form local welds 94 and 96 between the metallic wire 21 and the metal 18 on the metal coated 18 ceramic fibre 14 of the annular fibre preform 20. This method comprises providing a metal wire 21 adjacent to and abutting the annular fibre preform 20 and forming a local weld, or a fusion, 94 between the metal 18 of the metal coated 18 ceramic fibre 14 at a first position 90 to the metal wire 21 and to form a local weld, or fusion, 96 between the metal 18 of the metal coated 18 ceramic fibre 14 at a second position 92 to the metal wire 21. Again the welds 94 and 96 may be arranged along a radius of the annular fibre preform 20 or longitudinally along the metal coated 18 ceramic fibre 14 and metal wire 21.

A seventh method of bonding the metal of the metal coated 18 ceramic fibre 14 is shown in FIG. 13. This method is similar to that shown in FIG. 7 and in this method the metal coated 18 ceramic fibre 14 is wound such that the metal 18 on adjacent turns of the metal coated 18 ceramic fibre 14 abut each other. This method comprises producing a local weld, or a fusion, 74 between the metal 18 of the metal coated 18 ceramic fibre 14 at a first position 70 to the metal 18 of the metal coated 18 ceramic fibre 14 at a second position 72. The local weld 74 is produced using an ultrasonic welder U or two ultrasonic welders U positioned on opposite sides of the metal coated 18 ceramic fibre 14. Furthermore, the ultrasonic welder U is used to locally form a plurality of welds 74 between the metal of the metal coated 18 ceramic fibre 14 at a plurality of first positions 70 to the metal 18 of the metal coated 18 ceramic fibre 14 at a plurality of second positions 72. As shown in FIG. 13 the welds 74 are arranged along a radius of the annular fibre preform 20 and a plurality of welds 74 may be arranged along each of one or more radii of the annular fibre preform 20. Alternatively, a plurality of welds 74 may simply be arranged longitudinally spaced along the spirally wound metal coated 18 ceramic fibre 14 between the metal 18 on adjacent turns of the metal coated 18 ceramic fibre 14.

An eighth method of bonding the metal of the metal coated 18 ceramic fibre 14 is shown in FIGS. 14 and 15. In this method the metal coated 18 ceramic fibre 14 is wound such that the metal 18 on adjacent turns of the metal coated 18 ceramic fibre 14 abut each other. This method comprises providing a metal strap 100 and wrapping the metal strip 100 around the annular fibre preform 20. Ultrasonic welders U are used to locally form a weld, or a fusion, 106 between the metal 18 of the metal coated 18 ceramic fibre 14 at a first position 102 to the metal strip 100 and to form a weld, or fusion, 108 between the metal 18 of the metal coated 18 ceramic fibre 14 at a second position 104 to the metal strip 100. Thus, the welds 106 and 108 bond the metal 18 of the metal coated 18 ceramic fibre 14 at the first position 102 to the metal 18 of the metal coated 18 ceramic fibre 14 at the second position 104. The ultrasonic welder U locally welds the annular fibre preform 20 and metal strip 100 to form a plurality of welds 106 and 108 between the metal 18 of the metal coated 18 ceramic fibre 14 at a plurality of first positions 102 to the metal 18 of the metal coated 18 ceramic fibre 14 at a plurality of second positions 104. As shown in FIG. 14 the welds 106 and 108 are arranged along a radius of the annular fibre preform 20 and metal strip 100 and a plurality of welds 106 and 108 may be arranged along each of one or more radii of the annular fibre preform 20 and metal strip 100.

Figure 16:
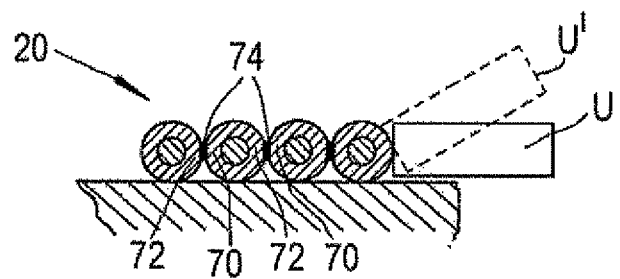
FIG. 16 is a cross-sectional view through a portion of a fibre preform showing a ninth method of bonding the fibre preform together.

FIG. 16 shows an alternative ninth method for achieving the ultrasonic welding process described above with respect to FIG. 13. In this method the ultrasonic welder U is positioned in a radially outward direction of the annular fibre preform 20 and accordingly vibrates to produce rubbing to form the local weld 74 between the metal 18 at the first position 70 to the metal 18 at the second position 72. As with the arrangement described with respect to FIG. 13 two ultrasonic welders U may be used to produce the local weld 74, the second ultrasonic welder U may be arranged in a direction radially inward of the annular fibre preform 20. FIG. 16 also shows the ultrasonic welder U' may act on, or vibrate, the metal coated 18 ceramic fibre 14 at an angle to the radial direction of the annular fibre preform 20.

Figure 17:
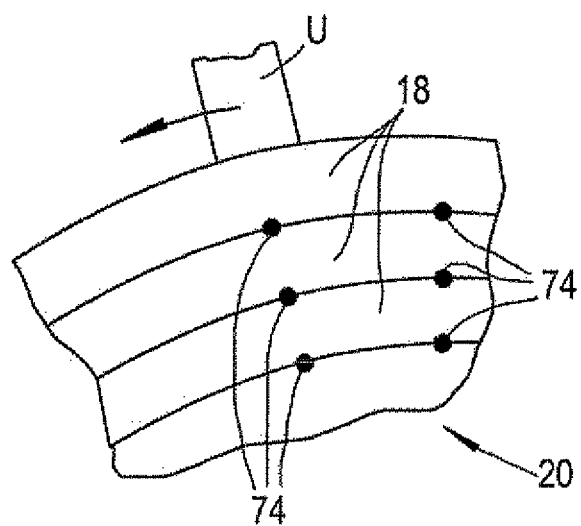
FIG. 17 is a plan view of a portion of a fibre preform showing the ninth method of bonding the fibre preform together.
Figure 18:
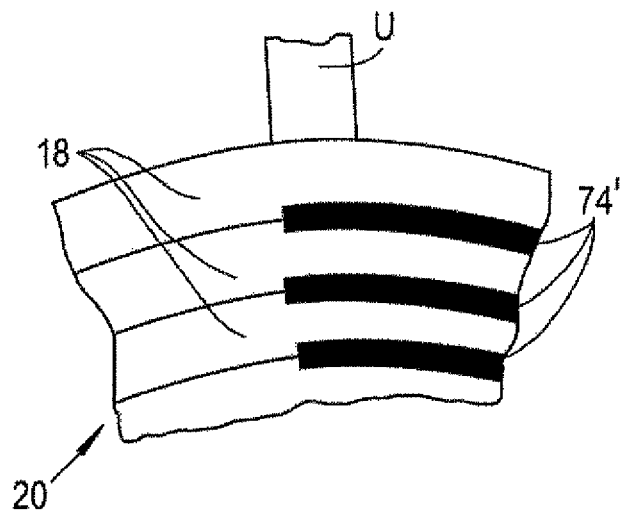
FIG. 18 is an alternate plan view of a portion of a fibre preform showing the ninth method of bonding the fibre preform together.

FIG. 17 further shows an arrangement where the ultrasonic welder U is positioned in a radially outward direction of the annular fibre preform 20. As the metal coated 18 ceramic fibre 14 is wound to produce the annular fibre preform 20, the ultrasonic welder U is moved circumferentially about the annular fibre preform 20 forming a series of local welds 74. Alternatively, as the metal coated 18 ceramic fibre 14 is wound to produce the annular fibre preform 20, the ultrasonic welder U is held stationary and the ultrasonic welder U is operated periodically to form local welds 74 one after another. It may be found, as shown in FIG. 18, that a continuous line welding process may be achieved using this arrangement, where the ultrasonic welder U forms a continuous line weld 74' as the metal coated 18 ceramic fibre 14 is wound to produce the annular fibre preform 20.

In another method (not shown) it may be possible to bond adjacent turns of the metal of the metal coated ceramic fibre together by providing at least one line weld between adjacent turns of the metal coated ceramic fibre. There may be a plurality of longitudinally spaced line welds between adjacent turns of the metal coated ceramic fibre or there may be a single line weld between adjacent turns extending substantially the full longitudinal length of the metal coated ceramic fibre.

The at least one ceramic fibre comprises a silicon carbide fibre, a silicon nitride fibre, a boron fibre, a carbon fibre, a tungsten fibre or an alumina fibre.

The at least one metal coated fibre comprises a titanium coated fibre, a titanium alloy coated fibre, a titanium aluminide coated fibre, an aluminium coated fibre, an aluminium alloy coated fibre, a copper coated fibre, a copper alloy coated fibre, an iron coated fibre, an iron alloy coated fibre, a cobalt coated fibre, a cobalt alloy coated fibre, magnesium coated fibre or a magnesium alloy coated fibre or any other suitable metal coated fibre or metal alloy coated fibre.

The first and/or the second metal component comprises titanium, titanium alloy, titanium aluminide, aluminium, aluminium alloy, copper, copper alloy, iron, iron alloy, cobalt, cobalt alloy, magnesium, magnesium alloy or any other suitable metal or alloy.

Although the present invention has been described with reference to providing a circumferentially extending groove in a face of a first metal ring and a circumferentially extending projection on a face of a second metal ring it is equally applicable to the provision of a circumferentially extending groove on a radially outer or inner face of a ring. The circumferentially extending groove may be defined by a radially extending removable member.

The present invention is also applicable to the use of a plurality of metal coated fibres extending in a single direction with the metal coated fibres being arranged in layers and with the layers being stacked upon each other. Thus, each fibre preform may comprise a plurality of metal coated fibres extending in a single direction with the metal coated fibres being arranged in a single layer. Thus, the metal coated fibres may be arranged in planes, or in sheets, with the metal coated fibres extending in a single direction and with or without metal wires between the metal coated fibres. The metal coated ceramic fibres in these preforms may also be bonded together using any one, or more, of the techniques shown in FIGS. 7 to 18. It may be desirable to use the arrangement in FIG. 10 which has a space between the metal coated ceramic fibres to allow bending of the fibre preform especially for producing articles with curved surface e.g. shafts. The space between the metal of the metal coated ceramic fibres is adjustable to vary the amount of bending of the fibre preform. The method may comprise arranging a plurality of metal coated fibres in a plane with the metal coated fibres extending in a single direction. The method may comprise arranging the plurality of metal coated fibres such that the metal on adjacent metal coated fibres abuts each other. The method may comprise arranging the plurality of metal coated fibres such that there is a space between the metal on adjacent metal coated fibres.

The method may comprise arranging a plurality of metal wires with the plurality of metal coated fibres such there is a metal wire between adjacent metal coated ceramic fibres. The metal of each metal coated ceramic fibre is bonded to the metal of each of its adjacent metal coated ceramic fibres by one or more bonds, or welds.

The present invention is also applicable to any arrangement where the metal coated fibres are placed between two or more metal components.

Although the present invention has been described with reference to reinforcement of metal rings it is equally applicable to other arrangements and in such cases the reinforcing metal coated fibres will be arranged accordingly. The present invention is equally applicable for producing shafts, stators, structural components, components of electrical machines etc.

Although the present invention has shown the ultrasonic welder moving radially across the metal coated ceramic fibres, or metal coated ceramic fibres and metal wires, it is equally possible to move the ultrasonic welder parallel to the longitudinal direction of the metal coated ceramic fibres, transverse to the longitudinal direction of the metal coated ceramic fibres or a combination of parallel to the longitudinal direction of the metal coated ceramic fibres and transverse to the longitudinal direction of the metal coated ceramic fibres.

The advantage of the present invention is that it avoids potential contamination of the fibre reinforced metal matrix composite material article, or component, from the use of organic glues previously used to hold the reinforcing fibres in position during assembly. Contamination is known to reduce the mechanical properties of the fibre reinforced metal matrix composite material article and thus the present invention increases the quality of the fibre reinforced metal matrix composite material article. In addition the present invention dispenses with the requirement to remove the glue from the reinforcing fibres and thus dispenses with the requirement to heat the sealed assembly whilst being evacuated to remove the glue and potentially reduces the manufacturing time. However, there is still a requirement to heat the sealed assembly whilst being evacuated to remove moisture, but this is for a shorter time period and at a lower temperature than that required to remove the glue.

A further advantage of the present invention is that the ultrasonic welding of a metal coated ceramic fibre to itself, the ultrasonic welding of adjacent metal coated ceramic fibres together or the ultrasonic welding of a metal coated ceramic fibre to a metal member is performed at a much lower welding temperature. As a result there is less likelihood of damage to the metal coated ceramic fibre and/or the weld zone is less prone to brittleness. The use of a laser beam, or an electron beam, on the other hand is performed at a much higher welding temperature and if the beam is not accurately positioned may impinge upon and damage a ceramic fibre and/or the weld zone is more prone to brittleness.

The invention claimed is:

1. A method of manufacturing a fibre reinforced metal matrix composite article, the method comprising the steps of:
   (a) forming a first metal component,
   (b) forming a second metal component,
   (c) forming at least one fibre preform, the at least one fibre preform comprising at least one metal coated fibre,
   (d) bonding the metal at least one first portion of the at least one metal coated fibre of the at least one fibre preform to the metal at least one second portion of the at least one metal coated fibre of the at least one fibre preform to hold the at least one fibre in position, wherein the bonding comprises ultrasonic welding,
   (e) placing the at least one fibre preform between the first metal component and the second metal component,
   (f) sealing the second metal component to the first metal component, and
   (g) applying heat and pressure such as to consolidate the at least one fibre preform and to diffusion bond the metal on the fibre of the at least one fibre preform, the first metal component and the second metal component to form a unitary composite article.

2. A method as claimed in claim 1 wherein step (d) comprises bonding the metal at a plurality of first portions of the at least one metal coated fibre of the at least one fibre preform to the metal at a plurality of second portions of the at least one metal coated fibre of the at least one fibre preform to hold the at least one fibre in position.

3. A method as claimed in claim 1 wherein step (d) comprises local ultrasonic welding to directly bond the metal at the least one first portion to the metal at the at least one second portion.

4. A method as claimed in claim 1 wherein step (d) comprises providing a metal member and bonding the metal at least one first portion of the at least one metal coated fibre of the at least one fibre preform to the metal member and bonding the metal at least one second portion of the at least one metal coated fibre of the at least one fibre preform to the metal member to hold the at least one fibre in position.

5. A method as claimed in claim 4 wherein the metal member is selected from a group comprising a metal wire and a metal foil.

6. A method as claimed in claim 4 wherein step (d) comprises wrapping the metal member around the at least one metal coated fibre.

7. A method as claimed in claim 1 wherein (d) comprises ultrasonic welding the metal of the at least one metal coated fibre of the least one fibre preform to the metal coated fibre of the at least one fibre preform in a line weld.

8. A method as claimed in claim 1 wherein step (c) comprises winding the at least one metal coated fibre in a spiral.

9. A method as claimed in claim 8 wherein step (c) comprises winding the at least one metal coated fibre such that the metal on adjacent turns of the metal coated fibre abut each other.

10. A method as claimed in claim 8 wherein step (c) comprises winding the at least one metal coated fibre such that there is a space between the metal on is adjacent turns of the metal coated fibre.

11. A method as claimed in claim 8 wherein step (c) comprises winding at least one metal wire with the at least one metal coated fibre in a spiral.

12. A method as claimed in claim 1 wherein step (c) comprises arranging a plurality of metal coated fibres in a plane with the metal coated fibres extending in a single direction.

13. A method as claimed in claim 1 wherein the at least one fibre is selected from a group comprising a silicon carbide fibre, a silicon nitride fibre, a boron fibre, a carbon fibre, a tungsten fibre and an alumina fibre.

14. A method as claimed in claim 1 wherein the at least one metal coated fibre is selected from a group comprising a titanium coated fibre, a titanium alloy coated fibre and a titanium aluminide coated fibre.

15. A method as claimed in claim 1 wherein the first metal component is selected from a group comprising titanium, titanium alloy and titanium aluminide.

16. A method as claimed in claim 1 wherein step (a) comprises forming a groove in the first metal component, step (e) comprises placing the at least one fibre preform in the groove of the first metal component and placing the second metal component in the groove of the metal component.

17. A method as claimed in claim 16 wherein step (b) comprises forming a projection on the second metal component and step (e) comprises placing the projection of the second metal component in the groove of the first metal component.

18. A method as claimed in claim 17 wherein step (a) comprises forming a circumferentially and axially extending groove in an end face of the first metal component, step (b) comprises forming a circumferentially and axially extending projection on an end face of the second metal component, step (c) comprises winding at least one metal coated fibre on a former to form the fibre preform, step (e) comprises placing the fibre preform in the circumferentially extending groove of the first metal component and placing the second metal component in the groove of the first metal component.

19. A method as claimed in claim 1 wherein the fibre reinforced metal matrix composite article is selected from a group comprising a rotor, a shaft and a stator.

20. A method as claimed in claim 19 wherein the fibre reinforced metal matrix composite article comprises a rotor with integral rotor blades.

21. A method as claimed in claim 19 wherein the fibre reinforced metal matrix composite article is selected from a group comprising a gas turbine engine rotor, a gas turbine engine shaft and a gas turbine engine stator.

22. A method as claimed in claim 19 wherein the fibre reinforced metal matrix composite article is selected from a group comprising an electrical machine rotor, an electrical machine shaft and an electrical machine stator.

23. A method of manufacturing a fibre reinforced metal matrix composite article, the method comprising the steps of:
    (a) forming a first metal component,
    (b) forming a second metal component,
    (c) forming at least one fibre preform, the at least one fibre preform comprising at least one metal coated fibre,
    (d) bonding the metal at least one first portion of the at least one metal coated fibre of the at least one fibre preform to the metal at least one second portion of the at least one metal coated fibre of the at least one fibre preform to hold the at least one fibre in position, wherein the bonding comprises electron beam welding,
    (e) placing the at least one fibre preform between the first metal component and the second metal component,
    (f) sealing the second metal component to the first metal component, and
    (g) applying heat and pressure such as to consolidate the at least one fibre preform and to diffusion bond the metal on the fibre of the at least one fibre preform, the first metal component and the second metal component to form a unitary composite article.

24. A method as claimed in claim 23 wherein step (d) comprises local electron beam welding to directly bond the metal at the least one first portion to the metal at the at least one second portion.

25. A method as claimed in claim 23 wherein step (d) comprises providing a metal member and bonding the metal at least one first portion of the at least one metal coated fibre of the at least one fibre preform to the metal member and bonding the metal at least one second portion of the at least one metal coated fibre of the at least one fibre preform to the metal member to hold the at least one fibre in position.

\* \* \* \* \*